United States Patent [19]

Doundoulakis

[11] 4,281,628
[45] Aug. 4, 1981

[54] HIGH EFFICIENCY TRI-ROTOR BALLISTIC ENGINE

[76] Inventor: George J. Doundoulakis, 2498 Kayron La., North Bellmore, Long Island, N.Y. 11710

[21] Appl. No.: 84,846

[22] Filed: Oct. 15, 1979

[51] Int. Cl.³ .......................................... F02B 53/00
[52] U.S. Cl. ..................................... 123/245; 418/34
[58] Field of Search ................... 123/245; 418/33, 34, 418/35

[56] References Cited

U.S. PATENT DOCUMENTS

| | | | |
|---|---|---|---|
| 1,308,352 | 7/1919 | Green | 123/245 |
| 3,288,122 | 11/1966 | Atsalos et al. | 123/245 |
| 3,294,071 | 12/1966 | Turco | 418/35 |
| 3,985,110 | 10/1976 | Doundoulakis | 123/245 X |
| 3,989,012 | 11/1976 | Doundoulakis | 123/245 X |
| 4,167,922 | 9/1979 | Doundoulakis | 123/245 X |
| 4,169,697 | 10/1979 | Doundoulakis | 418/34 |
| 4,212,271 | 7/1980 | Rigterink | 123/245 X |

FOREIGN PATENT DOCUMENTS 159538 2/1921 United Kingdom ................. 123/245

*Primary Examiner*—Michael Koczo, Jr.

*Attorney, Agent, or Firm*—Constantine A. Michalos; Peter C. Michalos

[57] ABSTRACT

A tri-rotor ballistic engine comprising a frame, a drum rotatably mounted on the frame having an output shaft, with a power cavity and an energy absorbing cavity defined therein. A power shaft is rotatably mounted in the drum. A reaction shaft is also rotatably mounted in the drum and axially aligned with the power shaft. A differential gearing or linkage device interconnects the power shaft, reaction shaft and drum.

A pair of inner power pistons are connected to the power shaft and extend radially outwardly thereof and into the power cavity of the drum. The drum includes a pair of outer power pistons which are integral with the drum and extend radially inwardly into the power cavity to define four power chambers with the inner power pistons. Two or more energy storing paddles extend radially outwardly from at least one of the power and reaction shafts and into the energy storing cavity of the drum. The drum, in this area, is provided with two or more energy storing separators which extend into the energy storing cavity and define a plurality of energy storing chambers with the energy storing paddles.

22 Claims, 12 Drawing Figures

HIGH EFFICIENCY TRI-ROTOR BALLISTIC ENGINE

BACKGROUND OF THE INVENTION

Cross Reference to Related Patents

This is a related application of the inventor's previous patent application having Ser. No. 828,090 now U.S. Pat. No. 4,167,922, entitled Internal Ballistic Engine. This invention also utilizes some structure from the inventor's previous U.S. Pat. Nos. 3,989,012 entitled Three Rotor Engine, 3,985,110 entitled Two Rotor Engine and 4,169,697 entitled Angular Compression Expansion Cylinder with Radial Pistons.

FIELD OF THE INVENTION

The present invention relates in general to engine construction and, in particular, to a new and useful high efficiency tri-rotor ballistic engine which utilizes the principles of an internal ballistic engine design introduced by the inventor, with modifications to reduce the internal mass moment of inertia of the rotating parts of the engine, improved control devices for controlling the operation of the engine and improved cooling means for air cooling the engine.

DESCRIPTION OF THE PRIOR ART AND APPLICABLE PHYSICAL PRINCIPLES

In the inventor's previous U.S. Pat. No. 4,167,922 from which this application is related thereto, it was shown that an efficient engine results when the pistons are free from mechanical connection to the output shaft of the engine. The word "Ballistic" used in describing the engine, relates to the fact that the position of the pistons is not directly controlled by the position of the output shaft, but is a function of the internal and external forces exerted on the piston. In a ballistic engine, the output shaft receives a forward torque through a reaction of gas pressure build up between the internal piston and a piston rigidly connected with the output shaft.

Figure 9A:
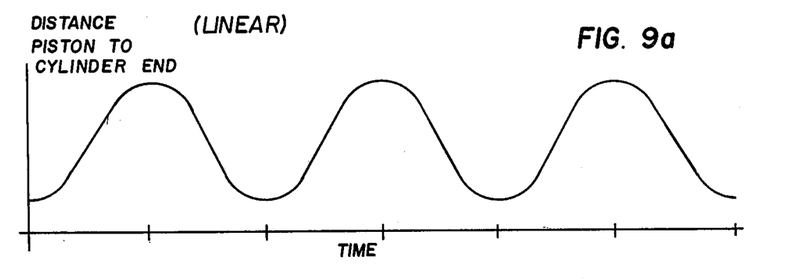
Figure 9B:
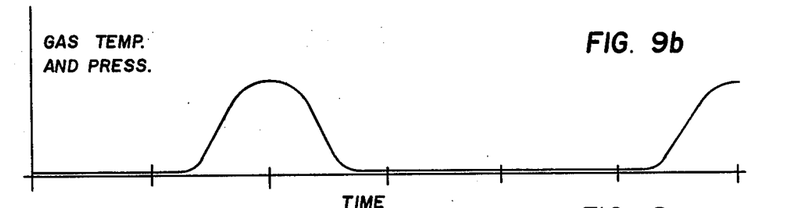

Reference is now made to the drawings at FIGS. 9a, 9b, 9c, and 9d. FIG. 9a represents the distance between the top of a conventional linear piston and the end of its corresponding cylinder plotted on the Y axis with time plotted on the X axis. FIG. 9b is a graph which is related in time with FIG. 9a, but which shows the internal temperature and pressure within the cylinder on the Y axis. Since temperature and pressure are directly related to each other, only one curve is shown on the graph of FIG. 9b. As can be readily understood from these curves, the motion of a conventional linear piston is a simple harmonic corresponding to the internal gas pressures and temperatures. The engine is assumed to be a four stroke engine so that the power stroke represented by the high gas and pressures of graph 9b take place with every other reciprocation of the piston within the conventional cylinder. The power stroke of a conventional linear piston engine is a relatively broad pulse, as shown in FIG. 9b.

Figure 9C:
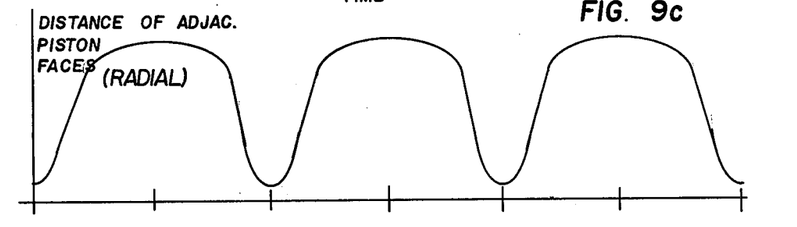

FIG. 9c represents the distance between adjacent radial pistons in the ballistic engine plotted against time and on the same scale as FIG. 9a. This distance between adjacent radial pistons corresponds with the change in volume of a combustion chamber which is analogous to the change in volume of the cylinder space in a conventional linear engine.

Figure 9D:
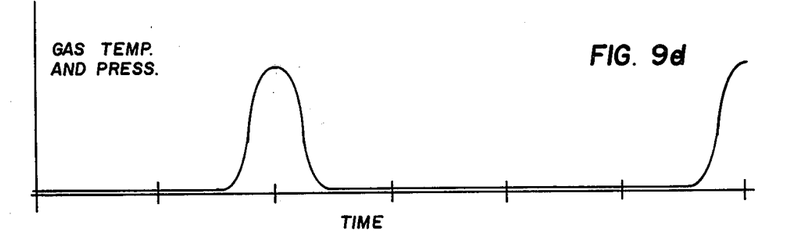

FIG. 9d represents the high temperature and pressure power strokes of the ballistic engine which is also on the same scale as the corresponding FIG. 9b for a conventional linear piston engine.

In the case of the Internal Ballistic Engine, the relative position of the piston does not have to be as harmonic as shown in FIG. 9c.

In escaping from the harmonic motion of the linear piston in a conventional engine, a substantially shortened power stroke is possible which shortens the time that the engine is exposed to high temperature and pressure as shown in FIG. 9d. Heat loss in an engine, which reduces the efficiency thereof, is known to be caused both by conduction and radiation. Heat loss is a complicated function of temperature, pressure, materials used, time and internal surface area. A reduction of the total area under the curve of FIG. 9b, as shown in FIG. 9d, substantially reduces the heat loss of the ballistic engine with respect to a conventional engine. Due to the structure of the ballistic engine, the overall width of each pulse in FIG. 9c, remains substantially unchanged as the RPM are lowered. This is an inherent advantage of ballistic engine design. The width, however, of the high temperature and pressure pulses of FIG. 9b, corresponding to linear piston engines, is broadened with lower RPM. This results in the fact that a ballistic engine has even more pronounced reduction through heat loss for low RPM.

Further, an internal ballistic engine can efficiently operate at a smaller reduction gear ratio between engine RPM and ultimate tire RPM. This advantageous operation of the engine at lower RPM without the sacrifice to output torque, further reduces friction and wear both of which are increased with higher engine RPM. It is conceivable therefor that a ballistic engine can be operated to power a vehicle without the need for the complicated conventional transmission and perhaps without the need of a transmission known in the conventional sence at all.

A theoretical maximum limit for efficiency has been calculated for various engine types. The actual overall efficiency, however, of an actual mechanical engine, is a function of various efficiency factors with each factor being itself a function of various parameters.

Thus; $E = E_1(a,b) \, E_2(a,c,d) \ldots E_n(g,f)$ where $E_1, E_2 \ldots E_n$ are the various efficiency factors, each having a value of from 0 to 1. The lower case letters in brackets represent the various parameters on which each efficiency factor depends.

EFFICIENCY FACTORS IMPROVED BY INVENTION

The present invention has distinctly improved efficiency factors which, for clarity, are set forth in numbered paragraphs below.

1. Thermal efficiency

This factor depends on temperature and pressure versus time, on the speed of combustion and on the temperature difference between the wall of a combustion chamber in an engine and the hot gases themselves. This last parameter is especially important during the time interval of combustion where the gases are at their highest temperature. This factor is improved when the temperature and pressure is high as compared with time, the combustion is fast and the difference between gas temperature and compression chamber wall temperature is minimized.

2. Mechanical efficiency

This factor is enhanced generally by a reduction in engine size and a reduction in overall length of sealing elements. The factor is also improved by reducing frictional losses within the engine. Frictional losses can be reduced by a reduction in gear ratio between the angular speed of the output shaft and the ultimate angular speed of the tires.

3. Weight and size efficiency

This factor is improved by a reduction in overall weight of the engine system which can be achieved for example, by the elimination of a cooling system, the cam shaft with poppet valves and external air cooling devices such as fan and belts connecting a fan to rotating parts of the engine. By reducing the engine size, this factor is also improved since this necessarily reduces the weight of a housing required for encasing the engine and reduces the weight of mounting devices needed for mounting the engine. Reducing the weight of an engine also reduces overall frictional losses. Frictional losses are, among other things, caused by the flexture of tires against a road surface. The reduction in overall engine weight will reduce the overall weight of a vehicle powered by the engine and thus reduce frictional losses from the tire flexture.

The factors set forth above will now specifically be treated below and together since they are interrelated with each other.

Referring once more to FIG. 9d, as already pointed out, a reduction in the width of each high pressure and temperature pulse will increase thermal efficiency. This width is reducable in the ballistic engine design described by the inventor in the parent to this application. The width depends on two parameters. The first being the torque developed by the internal forces in conjunction with the internal action piston area and the second being the internal mass moment of inertia of the tri-rotor engine design. In mathematical terms this relationship can be expressed by the equation:

$$a = T/I \tag{1}$$

Where "a" is the rotational acceleration, "T" is torque and "I" is the internal mass moment of inertia. The torque generated is a function of the internal gas pressure and the piston area acted on by this pressure. The internal mass moment of inertia, in a tri-rotor engine design according to the parent of this application, includes three components. They are the mass moment of inertia of the inner piston with its attached shaft, the mass moment of inertia of the differential coupling device which interengages the two inner pistons with each other and with the constant rotating drum, and the mass moment of inertia of the holding devices used for preventing one of the inner pistons from reversing its rotation and for controlling the release time of this piston In the present invention these holding means comprise, in one embodiment, the two brake plates with their associated brake and the control means for controlling the brakes.

While the torque can be increased by increasing the temperature and pressure of the hot gases this can be permitted only to a limited extent. This is true since at higher temperatures and pressures, NO$_x$ pollution is increased to an undesirable extent. Further, higher pressures contribute to an increase in frictional forces and wear in an engine and may cause damage in extreme cases. On the other hand, however, a higher compression ratio which is effected by higher pressures does increase thermal efficiency so that a relatively high pressure is desirable as long as it is kept within safe limits. In a tri-rotor ballistic engine design, this limit is considered to be below two thousand pounds per square inch.

Since torque can be effected only to a limited extent, the internal mass moment of inertia is the parameter most easily minimized in the design of an internal ballistic engine. The minimization of this mass moment of inertia is a main feature of the present invention. Several other points in the engine construction however, also contribute to high efficiency in other ways.

The reduction of mass moment of inertia becomes extremely important considering the relatively high rotational speed of this engine design which is on the order of three thousand RPM. This high speed contributes to an increase in horse power output for the same size engine, but of different design, and, to a certain point, also contributes to an increase in thermal efficiency as the area under the pulses in FIG. 9d is reduced, which thereby reduces the heat losses to the body of the engine.

A rotational speed higher than this optimum speed however, is not desirable since, at even higher RPM, heat losses in the exhaust are increased due to an incomplete burning of fuel. The inventive design permits the engine to rotate at an optimum speed for maximizing the overall efficiency It has been found that an optimum speed lies somewhere between 3,000 and 4,000 RPM for the tri-rotor ballistic engine design. To reach these speeds, special effort is needed in effectively reducing the mass moment of inertia The tri-rotor ballistic engine design of the parent application, when provided with a displacement of three hundred and fifty cubic inches, using aluminum for the pistons and steel for the shafts and gears, yields a mass moment of inertia of about 0.01 lbs-ft$^2$. This would restrict the engine from exceeding a rotational speed of 1,000 RPM.

An important consideration relating to the internal mass moment of inertia in a tri-rotor ballistic engine design, is the desirability of obtaining the energy needed for compression in each chamber from the rotational energy of the inner pistons or rotors. This energy is given by the equation:

$$E = \tfrac{1}{2} I w^2 \tag{2}$$

Where "I" is the mass moment of inertia and "w" is the rotational speed expressed in radians per second This energy is derived during the quick expansion of the combustion chamber at which time the energy, represented by high temperature and pressure, is quickly converted into rotational kinetic energy and stored in the accelerated pistons. At low RPM this energy is not sufficient to provide the energy for high compression ratios for the next chamber, while at high RPM, this energy is much higher than that which is needed for compression. At low RPM thus, some energy can be borrowed from a fly wheel which rotates with the engine. This is accomplished in a tri-rotor engine design simply by delaying the release of an internal piston or rotor at the end of a stroke. In a conventional linear piston engine however, the entire energy for compression is provided from a fly wheel action. In the Tri-Rotor Engine at high RPM when there is energy to spare in the kinetic energy of the pistons, this excess energy must be transferred to the output shaft or else the compression limits will be exceeded.

The present invention includes means for automatically controlling the amount of energy being transferred from the piston motion to the output shaft. This effectively reduces the amount of energy which remains for compression and controls this amount of energy within its desired limits. A preferred form for the ballistic tri-rotor engine is as a gasoline powered diesel. Such an engine can be started as a spark ignited gasoline engine at relatively low compression ratios on the order of five to eight. As soon as the engine warms up, however, its compression ratio can be increased to values of between about sixteen to twenty-two. At these compression ratios, the gasoline air mixture will be ignited both by spark, which remains available and can be used to advance the ignition, and by self ignition at the points where the gasoline temperature crosses a critical temperature, above 1,500 degrees F.

The compression ratio is controlled by controlling the instant at which each of the inner pistons or rotors is released compared with the rotation of the output shaft with respect to the ground support of the engine. The present application describes means for continuously controlling the compression ratio from its low values of about five to its high values of about twenty-two.

As already mentioned, in addition to thermal efficiency considerations, the overall efficiency of an engine also depends on its weight and auxiliary components which are needed for its operation. In the inventive engine arrangement, weight and auxiliary components are reduced not only by the specific engine configuration, but also by the provision of an intake and exhaust system which includes rotating and sliding ports which eliminate the need for a cam shaft and poppet valves which are used in conventional engine designs.

Overall weight is also reduced by utilizing the inventive self air cooling system which eliminates an external water cooling system and even fans used in the standard air cooling system. It has been found that by eliminating these extra components which are used in conventional engines, but not needed in the inventive internal ballistic tri-rotor engine, coupled with this substantial improvement in thermal efficiency, the inventive engine design can provide power at a rate of less than one pound per horse power output and perhaps even as low as 0.5 pounds per horse power output. This represents a reduction by several times in the size and weight of a conventional linear piston engine for the same output power.

SUMMARY OF THE INVENTION

The present invention provides a tri-rotor internal ballistic engine design which maximizes efficiency factors at several points and provides a comprehensive engine design which can be advantageously utilized in any vehicle form where a source of rotary power can be converted into vehicle motion. Although the application primarily and preferably shows the use of the engine as an internal combustion engine, other sources of internal pressurization can be utilized such as steam or the like to drive the engines.

Accordingly, an object of the present invention is to provide a tri-rotor ballistic engine comprising: a frame; a drum, rotatably mounted on said frame, having an output shaft, a power cavity defined therein and an energy absorbing cavity defined therein; a power shaft rotatably mounted in said drum; a reaction shaft rotatably mounted in said drum, differential means interconnecting said power shaft, reaction shaft and drum so that when said drum is rotated at constant angular velocity and one of said power and reaction shafts is held at zero angular velocity, the other of said power and reaction shafts rotates at twice said constant angular velocity; at least one inner power piston connected to said power shaft extending radially outwardly thereof and into said power cavity of said drum; said drum including at least one outer power piston extending into said power cavity to define at least two power chambers with said at least one inner power piston; at least one energy storing paddle extending from at least one of said power and reaction shafts and into said energy storing cavity of said drum; said drum including at least one outer energy storing separator extending into said energy storing cavity to define at least two energy storing chambers with said at least one energy storing paddle; first holding means connected to said power shaft for holding said power shaft at zero angular velocity; second holding means connected to said reaction shaft for holding said reaction shaft at zero angular velocity; control means connected to said first and second holding means for selectively activating them; and, power fluid means connected to said at least two power chambers for selectively pressurizing said power chambers and rotating said drum.

A further object of the present invention is to provide a tri-rotor ballistic engine design which can be directly connected to the ultimate driving means of a vehicle, such as its wheels, or connected thereto through a simplified transmission.

A further object of the present invention is to provide step motors for varying the compression ratio of the engine as it operates and for controlling said holding means.

A still further object of the present invention is to utilize hydraulic disc brakes with discs to form said first and second holding means.

A still further object of the present invention is to incorporate cooling fins on the drum itself and utlize and inventive array of ports for providing air cooling of the engine.

Another object of the present invention is to provide electronic controls for spark advance in the engine when it utilizes spark plugs and for controlling its compression ratio.

A still further object of the invention is to provide a tri-rotor internal ballistic engine which maximizes as many of the efficiency factors as possible as well as being simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENTS

Figure 1:
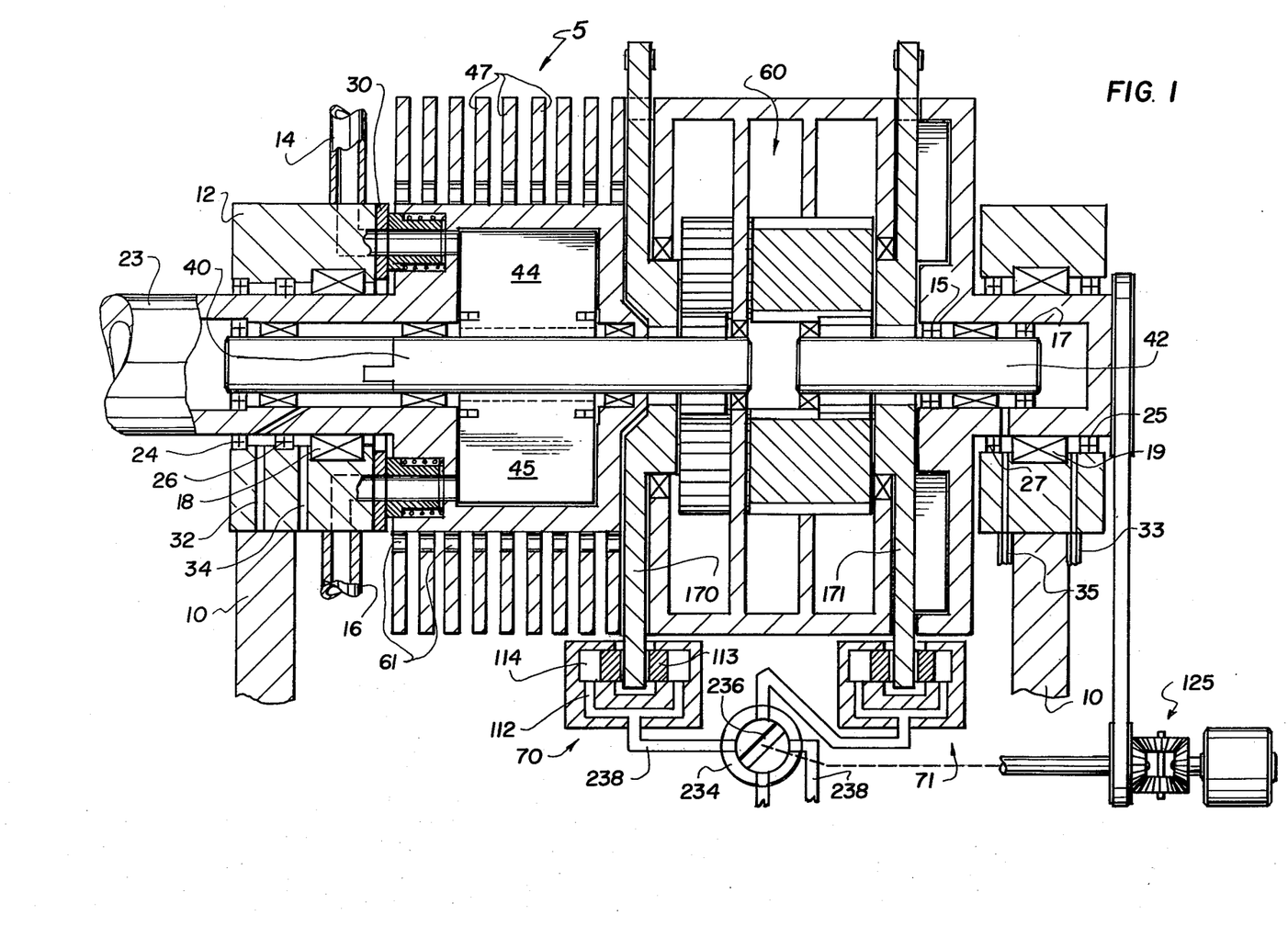
FIG. 1 is a side elevational view in section of the tri-rotor internal ballistic engine.

Referring now to the drawings in particular, the invention embodied therein in FIG. 1 comprises, a tri-rotor internal ballistic engine having a stationary frame 10 on which is rotatably mounted a drum generally designated 5 which, when the engine is operating, rotates at constant angular velocity. Rotatably mounted within suitably provided cavities of drum 5 are a power shaft 40 and an axially aligned reaction shaft 42. Drum 5, shaft 40 and shaft 42 are interengaged with each other through differential means 60. Details of this differential means can be found in the parent to the present application which is incorporated by reference here. These means may either take the shape of linkages or suitably provided gears. When drum 5 is rotated at constant angular velocity, and one of the shafts, either 40 or 42 is held at zero angular velocity with respect to the frame or support 10, the other of the shafts 40 or 42 rotates at twice the angular velocity of the drum 5.

Connected to the power shaft 40 and the reaction shaft 42 are holding means for selectively holding one or the other of the shafts at zero angular velocity with respect to the frame 10. Details of these holding means are disclosed in greater detail later in this application.

Figure 2:
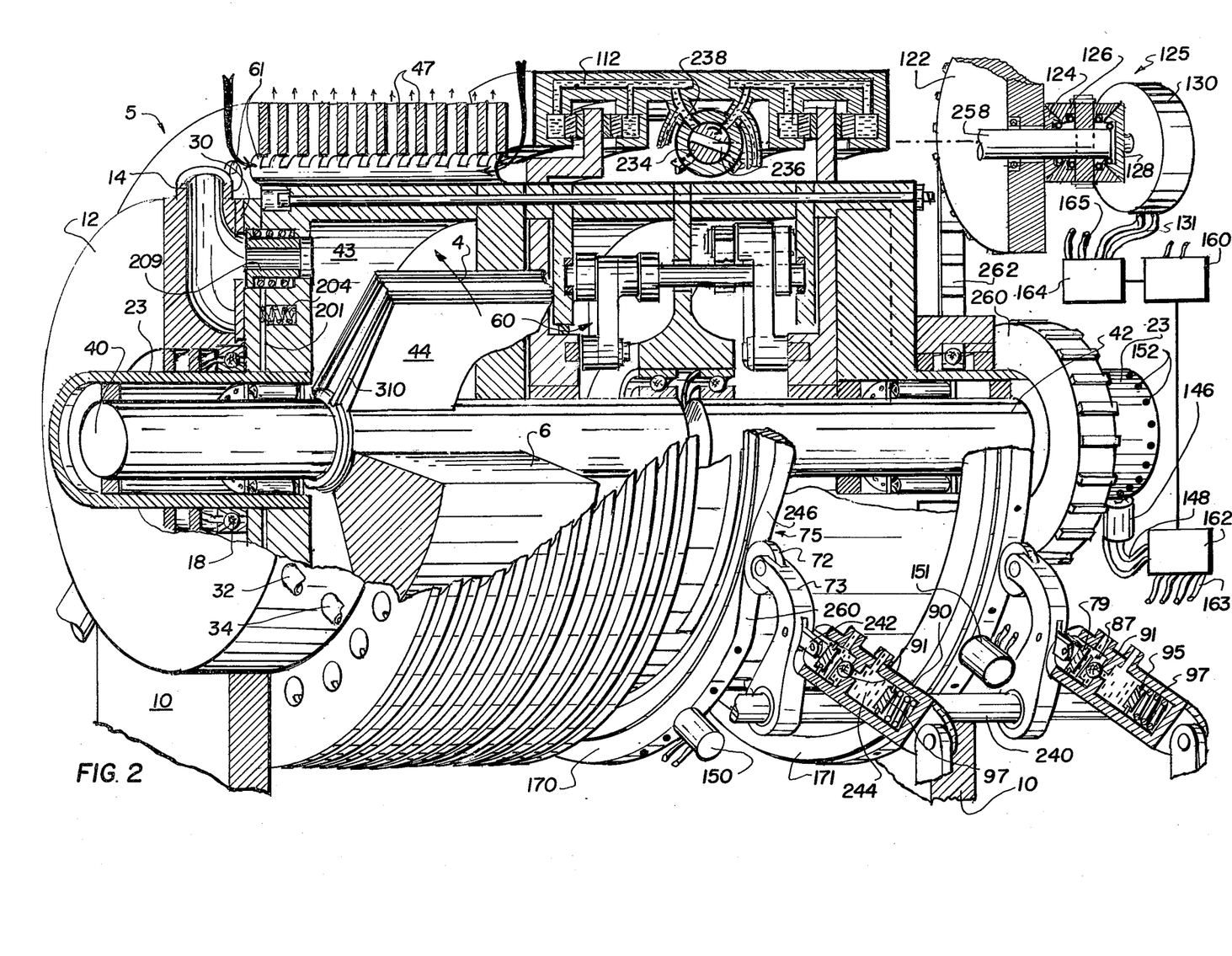
FIG. 2 is a side perspective view with portions cut away for clarity of another embodiment of the invention.

The embodiments of the invention shown in FIGS. 1 and 2 differ in certain details, however the same numerals are used to describe the same structure in both embodiments. With reference made to FIGS. 1 and 2, the stationary support 10 has various functions including, providing a stationary frame of reference or ground for the rotation engine, providing a support for bearings 18 and 19 which are connected to the constant rotating drum 5, providing a support for the intake conduit 14 and exhaust conduit 16 which communicate with the rotating engine to provide it with an air fuel mixture and means for exhaust, providing a support for oil conduits 32, 33, 34, and 35 which provide and circulate oil to the engine, and providing support for seals 15, 17, 24, 25, 26, and 27 which confine the lubricating oil in the proper paths.

Power shaft 40, which is analogous to one of the inner rotors of the ballistic engine in the parent application, includes two radially extending inner power pistons 44 and 45 which extend into a power cavity 43 of the drum 5. As best seen in FIG. 2, drum 5 includes two radially inwardly extending outer power pistons 6 which extend into the power cavity and are interleaved between the inner power pistons 44 and 45. Although only one outer power piston 6 is shown in FIG. 2, it is understood from the drawing and from the parent application that the two outer and two inner pistons define four power chambers therebetween. At any one time during the operation of the engine, two of these power chambers are decreasing in volume while the remaining two are increasing in volume. Although four chambers are shown, it should be understood that either more or fewer chambers can be provided by increasing or decreasing the number of inner and outer pistons. When changing the number of pistons however, care should be taken that the system is circumferentially balanced in its weight distribution.

An output shaft 23 is integrally connected with the drum 5 and forms a part thereof. Output shft 23 is axially aligned with the power shaft 40 and reaction shaft 42. As shown in the Figures, the output shaft 23 comprises an annular sleeve structure which encases a portion of the power shaft 40 on the left hand side of the Figures and a portion of the reaction shaft 42 on the right hand side of the Figures.

There are several improvements in the invention of the present application over that shown in the previous applications covering the tri-rotor motor and internal ballistic engine designs. These are outlined as follows:

(1) The inner rotor shaft 40 and 42 are located at the geometric center of the engine and along its major axis. The output shaft 23, on the other hand, is positioned concentrically around these central shafts. This situation is reversed from the previous tri-rotor motor design. This modification has resulted in a large decrease in the internal mass moment of inertia of the device since the mass moment of inertia is a multiple of the mass times the square of the distance from the axis of rotation. By bringing the oscillating shafts closer to the geometric center of the device, this has resulted in a large decrease in this mass moment of inertia. The output shaft, of course, operates at substantially constant rotational speed so that once the engine is started, there is no change in the mass moment of inertia of the output shaft which acts as a fly wheel for the engine.

While not shown in FIGS. 1 and 2, it is possible and may also be desirable for the power shaft 40 to be located inside the output shaft 23 while the reaction shaft 42 is to be reversed with the output shaft which can be positioned along the axis of the engine. The reaction shaft 42 is to be disposed around the output shaft as was the case in the related application.

(2) The ratchets and overriding clutches used in the previous inventions have been eliminated and have been replaced by hydraulically operated disc brakes which accurately perform the function of selectively holding one of the central shafts or the other to permit the operation of the engine. A differential mechanism generally designated 125 and explained in more detail later, has also been added for accurately controlling the phase relationship and moment of release of the inner rotor which permits an automatic and infinately variable adjustment of the compression ratio of the device.

(3) Cooling fins 47 in FIGS. 1 and 2 have been added which include apertures or holes 61 which in combination, provide an air cooling of the engine without adding appreciable weight or complexity thereto.

Figure 3:
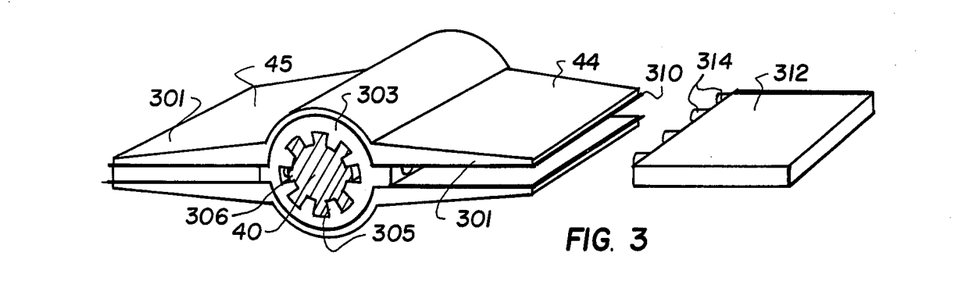
FIG. 3 is a perspective exploded view of an internal piston used in accordance with the invention.

(4) A particular design for the inner piston incorporating titanium for reducing the heat transfer while increasing the strength of the piston at elevated temperatures is used which has an aluminum core effective for cooling the piston sealing elements thus eliminating the need for oil circulation inside the piston. This design is best shown in FIG. 3 which will be described in greater detail hereinafter.

Figure 5:
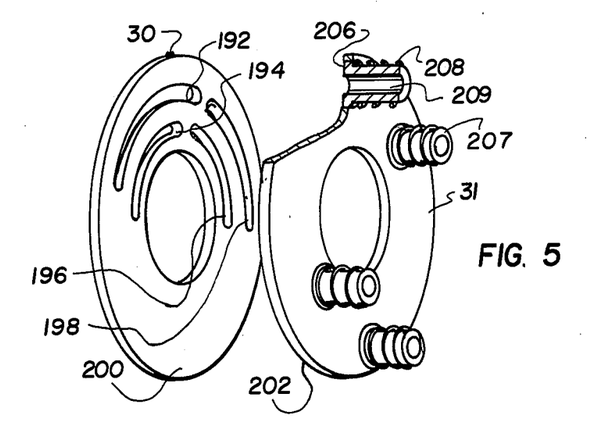
FIG. 5 is a side perspective and exploded view of the intake and exhaust ports with their associated apparatus and with portions cut away for clarity.

(5) Spring operated intake and exhaust ports have been provided which are best shown in FIG. 5.

Figure 6:
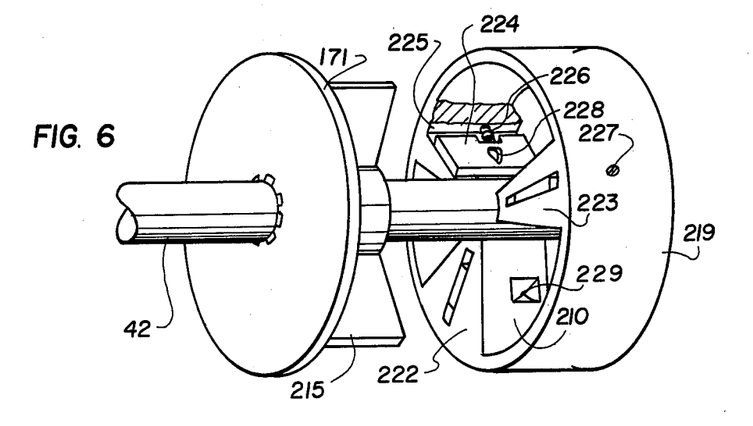
FIG. 6 is a side perspective exploded view of the energy storage apparatus used in accordance with the invention.

(6) Apparatus has been added for storing potential energy produced by the engine to increase the torque of the inner rotor at high speeds without an increase of temperature and pressure in the combustion chamber. This apparatus is best shown in FIG. 6.

(7) Rotor position monitoring means have been added to monitor the relative position of the three rotating entities, that is the two central shafts and the constant rotating drum. These position monitoring means can be utilized in combination with a microprocessor for effecting and modifying the intake of fuel air mixtures, the activation of the hydraulic disc brake holding devices and other functions of the engine which can be varied to optimize their operation. Such parameters include spark advance, compression ratio, fuel intake, rotor position and the like. More complex processes may be incorporated which depend on other parameters such as exhaust temperature, engine body temperature, and the like.

Turning to FIG. 2, microprocessor 160 is incorporated into an electronic control assembly which is coupled to a detection means through an input interface unit 162. Various input terminals 163 may be provided into interface unit 162 which provide the unit with parameters from various sensors distributed among the engine parts. The interface unit 162 is of known design for transforming analogue parameters into digital signals. The interface may also provide special interupt signals for the microprocessor to permit it to receive various signal parameters which are occuring simultaneously.

A magnetic sensor 146 is provided for sensing the passage of magnetic buttons 152 which are equally spaced about that end of the output shaft 23. Information concerning the radial location and speed of the constant rotating drum 5 can then be fed through lines 148 to the interface unit 162 and thereafter to the microprocessor 160. It should be understood that the magnetic sensor 146, 152 can be replaced by optical or any other suitable devices for sensing the radial speed and location of the constant rotating drum. In a similar fashion, magnetic or other sensing means 150 and 151 can be provided for sensing the speeds and relative positions of the power and reaction shaft respectively. This information is similarly conveyed through suitably provided lines to the interface unit 162. As an example of the workings of the interupt signals in the interface unit 162, while a temperature sensing operation is being conducted, this operation can be momentarily interupted in a periodic fashion to permit the reception of speed and angular position information from the sensors 146, 151 and 150. An output interface 164 is also provided and connected to the microprocesser 160. The output interface includes output terminals 165 for controlling various functions of the engine and output lines 131. Output lines 131 are shown connected to a step motor 130 which is part of the differential mechanismm 125.

Once in operation, the motion of each of the three rotors of the engine remains substantially the same from one complete cycle to the next. Through computer analysis and actual models, it has been found that it is advantageous to vary these motions slightly to optimize engine operation.

Figure 4:
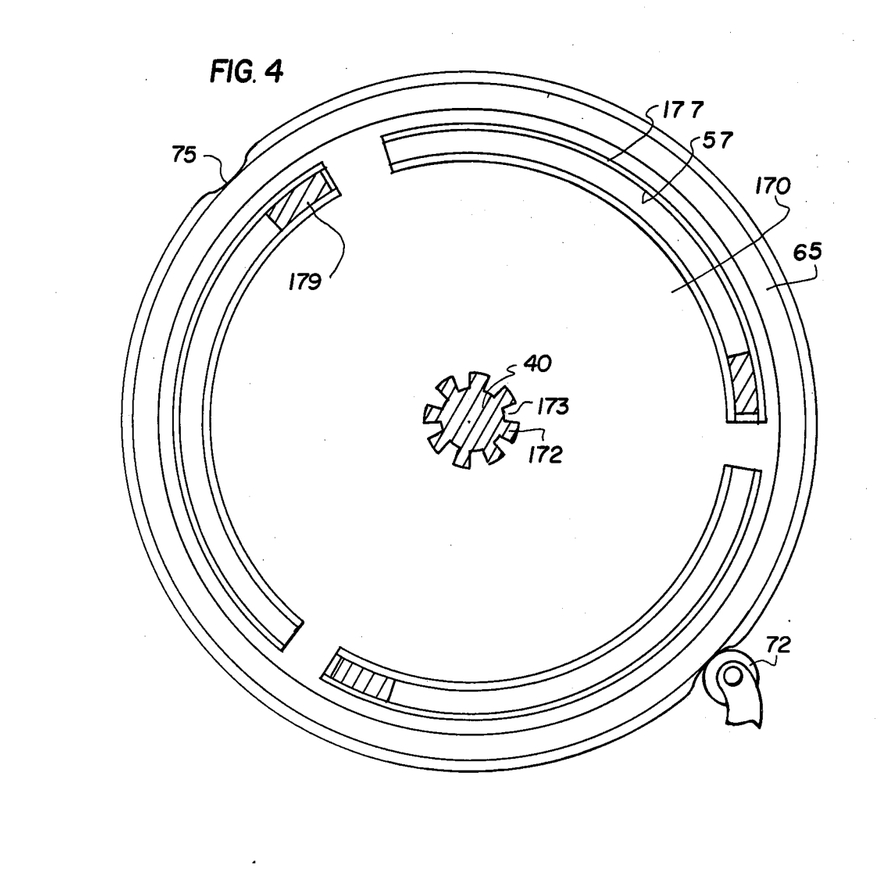
FIG. 4 is a front elevational view of one disc brake plate used in accordance with the invention.

In normal operation, the engine functions as follows: Output shaft 23 is rotated, by a suitably provided starting mechanism not shown at a substantially constant speed $W_0$. The chambers 43 defined between the interleaved rotors 44, 45 and the pistons 6, expand and contract as described in the previous application and patents on this engine design and supplied with an air fuel mixture which is ignited to produce an internal combustion effect. Mechanical access can be achieved to the rotor comprising shaft 40 and pistons 44 and 45 through the disc plate 170 connected thereto. Details of this disc or brake plate are shown in FIG. 4. The plate 170 is connected to shaft 40 through splines 172 and 173. A similar brake plate 171 is connected in a similar fashion to the reaction shaft 42 which, in the embodiment shown, carries an energy storing piston arrangement but no powering rotor and drum arrangement. Reaction shaft 42 and its associated parts are used as an abutment against which the power generated in the chambers 43 is applied to cause a rotary output in output shaft 23.

Partial circumferential slots 177 are provided in plates 170 and 171 which correspond to slots 57 defined in radially extending walls of the chambers 43. Through portions 179 are provided for connecting the two halfs of the constant rotating drum in this area and for simultaneously permitting a relative rotation of about 90° between the brake plate 170 and the constant rotating drum. The outer peripheral portions of the brake plates 170 and 171 extend radially outwardly beyond the constant rotating drum 5 and are provided with brake shoe areas 65 which are engageable at selected instances by hydraulic brake means generally designated 70 and 71 respectively and shown in FIG. 1. Each brake plate includes one or more indentations 75 which act as a cam for cam followers 72 shown in FIGS. 4 and 8. Cam followers 72 are connected to hydraulic valves hereinafter to be described in detail which activate the brake means 70 and 71 at selected instances related to the radial position of the indentation 75 with respect to the rest of the engine.

Plates 170 and 171 also provide mounting supports for the differential means 60 which interrelate their motions with each other and with the motion of the drum 5.

Turning back to the operation of the engine, while brake plate 171 is held motionless by the action of hydraulic brake means 71, shaft 40 is permitted to rotate at twice the angular speed of the constant rotating drum or at $2W_0$. This is caused by the action of differential means 60 which are described in detail in the related application. Also as described in the related application, the holding of the one shaft or rotor 40 caused the transmission of a forward torque to the output shaft 23.

At a predetermined instant, the brake plate 171 is released and the inner pistons 44, 45 continue to rotate in a forward direction but decelerate from $2W_0$ to zero rotational velocity. During this deceleration, the inner rotors are mechanically free and their position is a function of the torques acting on them and not on the position of or on any force applied to the output shaft 23. Some of the rotational momentum of the inner rotor is used up to compress the complimentary chamber 43 to prepare it for the next power stroke. Some of the energy is also transmitted to the output shaft and the balance is transmitted to an energy storage chamber 210 shown in FIG. 6 and to be described hereinafter. The amount of energy stored in this device is automatically governed by means hereinafter to be described in detail which increases with increased rotational speed.

The time at which the plate 171 is released corresponds to the closest angular distance in degrees between the walls of the inner and outer pistons which form the combustion chamber 43. Control of the release time of the brake plate therefore is an absolute control of the compression ratio of the device.

Assuming the rotation of piston 44 in a counter clockwise direction shown by arrow 4 in FIG. 2, during a stroke of the engine, each piston 44 and 45 will rotate 180 degrees so that piston 44 for example will wind up in the position originally held by piston 45 as shown in FIG. 1. The inner rotor carrying these pistons during the stroke moves at $2W_0$ while the drum carrying the outer pistons 6 moves at $W_0$. The volume of one of the chambers 43 will thus diminish at an angular velocity of $W_0$ until brake plate 171 is released. Upon release, the inner rotor carrying pistons 44 and 45 will decelerate with the volume of the chamber becoming minimized when the velocity of the inner piston is reduced to $W_0$. The instant this volume is minimized, corresponds to the top dead center point in a linear piston engine. The inner rotor will then continue to go forward a few degrees and then will come to rest. At this instant the inner piston tends to reverse its rotation. This reversal however is prevented by the activation of the hydraulic brake 70 which engages plate 170. This engagement is affected by the riding of cam follower 72 into indentation 75 which is suitably provided on the periphery of brake plate 170.

At this point, a power stroke is initiated in the chamber 43 opposite to the one which just previously experienced the power stroke while the internal piston is being held by the brake plate 170. The holding of brake plate 170 provides an abutment for the power generated in the chamber to be transferred in the form of torque to the output shaft 23. During this operation, the reaction shaft 42 with its associated parts is rotated at a velocity $2W_0$ while the outer piston connect to the drum approaches the now stationary inner piston 44 or 45, at a velocity of $W_0$. This continues until the instant at which brake plate 170 is released, at which instance the engine enters its ballistic mode with the pistons being free to move under the influence of the internal torque. Simultaneously with this the next chamber 43 which did not experience a power stroke, is undergoing a compression. Most of the energy for this compression is produced by the flywheel action of the engine while the rotational kinetic energy of the reaction shaft and rotor 42 is transferred to the power shaft and rotor 40.

In FIG. 5, the mechanism for supplying an air fuel mixture and venting an exhaust from the engine is shown. The timing of such supply and exhaust is achieved by the provision of a slotted plate 30 which is affixed to one of the supports 10 of the engine. As shown in FIGS. 1 and 2, the plate may be affixed to the stationary hub 12 which receives the oil conduits, exhaust and intake conduits, as well as providing support for the main bearing 18.

A port plate 31 is connected to the constant rotating drum 5 and has a surface 202 which abuts a surface 200 of plate 30. Port cylinders 209 are provided which have front face surfaces 206 which abut the surface 200 of plate 30. They are biased by a spring 208 against the surface 200 and made for example, of grey cast iron to serve as an interface for the internal chambers 43. Weeker springs 204 are provided as shown in FIG. 2 for biasing the port plate 31 against the slotted plate 30. In this fashion, a satisfactory sealing of the gases is achieved. During intervals of high pressure, a surface 207 of the cylinders 209 is more strongly forced against the plate 30 thus increasing the sealing effect exactly during the times when such effect is most necessary. Arcuate slots 192 and 198 act as intake and exhaust slots for what is termed a type B chamber as defined in the parent application. This is one of the chambers 43 defined between the power rotor and the constant rotating drum. The arcuate slots 195 and 196 correspond to intake and exhaust ports for a type A chamber also as defined in the parent application. An oil bath is provided between the surfaces 200 and 202. A space 201 is provided between the port plate 31 and the body of the drum 5 for thermal expansion of the drum 5.

In a particularly simple and efficient manner, the engine is air cooled by fins 47 which include axially extending openings 61 which are positioned nearest the chambers 43. As shown by the direction of the arrows, air is pulled into openings 61 and, by centrifugal force and the friction between the air and the sides of fins 47, is forced radially outwardly and act as a fan. Fins 47 can be provided on the drum 5 exactly where the heat is produced, that is over the power rotor 40, 44, 45. Fins themselves act as heat sinks for heat generated in the drum 5 and have been found to be very efficient in cooling the drum. A shroud not shown, can be provided over the drum for regulating the amount of air conducted through the openings 61 if overcooling becomes a problem.

Turning to FIG. 6, the energy accumulation and storage apparatus used in accordance with the invention will now be described.

The functioning of the energy accumulation and storage mechanism of this and the parent application is to store excess energy generated by the invention in a ballistic manner and then controlably apply this absorbed energy to the output shaft of the engine. Brake plate 171 is shown connected to a plurality of radially extending paddles 215 which define with radially extending outer pistons 222, a plurality of energy accumulation compression and expansion chambers 210. Outer pistons or radial separators 222 are carried on an energy drum 219. Drum 219 is connected to or forms an integral part of the constant rotating drum 5. The left hand side of each chamber 210 is closed off by a surface interaction between the right hand surface of brake plate 171 and the top surface 223 of drum 219 with separators 222. Six compression and expansion chambers are defined between the interleaved separators 222 and paddles 215. It should be understood that fewer or greater number of such chambers can be defined by adding or subtracting from the number of paddles and separators and also that although the paddles are here shown connected to the reaction shaft 42 for convenience of assembly and arrangement of parts the paddles and energy absorbing arrangement can be engaged with the power shaft 40 and work equally well. As with the connection between brake plate 170 and shaft 40, brake plate 171 is connected through splines to the reaction shaft 42. Three chambers at a time reduce in volume as the engine operates and provide a counter torque through the interaction of pressure built up in the chambers with the paddles which help the shaft 42 to reverse its motion. This torque adds to the internal torque from the combustion stroke but without contributing to the high temperature and pressure which, among other things, produces $NO_x$ pollution.

Variable gas passage means are provided through the separators 222 to permit a controlled flow of pressurized air from one chamber which is undergoing compression to an adjacent one which is undergoing expansion. Openings or passages 229 are provided through the separators 222 which passages correspond to an opening 228 which is of a varying cross sectional size in a direction radially outwardly of the shaft 42 and provided through vanes 224. Vanes 224 are mounted to slide within slots 225 provided within each separator 222. Each vane 224 is biased by a spring 226 which tension can be varied by a screw 227 to remain in its radially inward position when the shaft 42 is motionless. With increase rotational speed of shaft 42, vane 224, through centrifugal force, is forced by its own mass against the bias of spring 226 radially outwardly to gradually close off the passage 229. At higher RPM's for the engine thus, a higher accumulation of energy is achieved in the chambers since less of the fluid is permitted to escape to an adjacent expanding chamber. Without a highly efficient energy storage device as disclosed, the rotational speed of the engine is limited to a certain extent to about 1,000 PRM. Above this rotational speed, prohibitively high pressures would exist which would contribute to $NO_x$ pollution and also possibly result in damage to the engine. With small additions of weight and internal mass moment of inertia, the disclosed energy storage device can be added to the engine to store considerable amounts of energy and at the same time provide an opposing torque for increasing the effective acceleration of the rotors during stoping and starting. It has been found through computer models that the provision of these means increases the top speed of the engine by approximately 50%.

At low RPM's, the energy in the inner rotors is needed for compression so that less is available for energy accumulation. Vanes 224 are thus provided with shaped openings 228 so that little or no energy is accumulated when the engine is rotated at low RPM's. Thus, the system is self adjusting for the different conditions during varied engine operation.

It should also be noted that the energy accumulation portion of the invention would not involve a heat build up as a net affect since any warming of the compressed fluid in a contracting chamber would be offset by the corresponding cooling of fluid in an adjacent expanding chamber which affects of warming and cooling are functions of the change in pressure on the fluid, which in the embodiment shown is air. Further, no specialized sealing rings would be required since the additional leakage of air into or out of the chambers should be offset and in any case, is irrelevant in view of in view of the controled leakage through the openings 228. If necessary, valves may be provided communicating the chambers with the ambient pressure to make up any loss in air due to its being squeezed out of the chambers.

Figure 8:
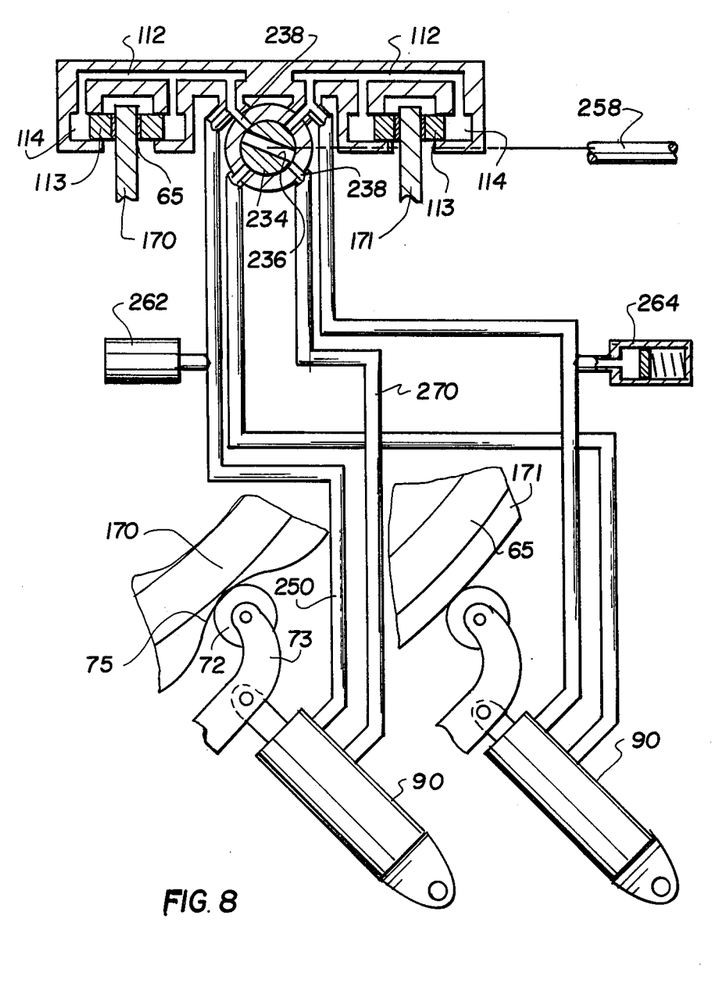
FIG. 8 is a diagramatical view of the hydraulic disc brake arrangement used in accordance with the invention; and, FIG. 9a through 9d are graphs showing the movement of pistons as related to the gas temperature and pressure within combustion chambers of convention internal combustion engines and the inventive tri-rotor ballistic engine.

Turning now to FIGS. 2 and 8, the hydraulic brake system used in accordance with the invention for selectively holding disc brake plates 170 and 171 comprise lever arms 73 which rotatably carry the cam followers 72 which follow the outer rim of the disc brakes 170 and 171 and the indentations 75 therein. Lever arms 73 are mounted for rotation on a common shaft 240 which is stationary and fixed to the support 10. The lever arms 73 are linked through pivotally mounted pins 242 to cylinders 90. A chamber 244 is defined in each cylinder 90 which is filled with hydraulic fluid and maintained under pressure by a free piston 95 biased with a spring 97. This pressure is transmitted through a ball valve 91 to another piston 79 which is directly linked through pin 242 to lever arm 73. The indentation 75 is positioned at approximately 45 degrees from the radial inner pistons 44 and 45. At a relative position of about 40 degrees, at which angle the inner piston reaches its closest approach to the outer piston of the drum, the ramp 246 of the indentation 75 is encountered by the roller or cam follower 72. The cam follower 72 thus follows the ramp 246 causing piston 79 to move toward the central axis of the engine and cause the displacement of some fluid from chamber 244 past valve 91 and into a chamber 87 behind the piston 79. It requires a few more degrees of rotation before the inner piston reaches its zero velocity position and tends to reverse its direction of motion under the influence of the pressure within its chamber. In doing so, the cam follower 72 tries to climb back up the ramp 246 but this motion exerts a pressure on the hydraulic fluid in chamber 87 through its action on piston 79. Since valve 91 has now closed the pressure buildup takes place. The pressure in chamber 87 is conducted through a line 250 to at least one of the hydraulic brake elements 70 or 71. As shown in FIGS. 1 and 8, the hydraulic elements comprise hydraulic fluid chambers 112 which are filled with hydraulic fluid. Chambers 112 end at sectional cylinders 114 where the fluid can act on sectional pistons 113 to squeeze shoes 65 on brake plates 170 and 171 and stop their rotation. Line 250 also connects with one port of a ball valve 234. Ball valve 234 is rotated by a shaft 258 which in turn is rotated by toothed wheels 122 and 260 which are connected by a timing belt 262. While shaft 258 is thus rotated at a 1:1 speed ratio with the output shaft 23, its angular position is variable by the differential means generally designated 125.

A first side gear 124 is connected to the pulley 122 and meshed with planetary gears 126 which in turn are meshed to a second side gear 128 connected to the shaft of step motor 130. Differential 125 can thus be operated to change the angular position of the ball valve 234 and thus actively control the instant at which the disc brake means 70 and 71 are energized. As long as the ball valve 234 remains closed, the power rotor connected to shaft 40 may creep up to 45 degrees. This is so because, as long as the roller or cam follower 72 rolls toward the bottom of the indentation 75, (corresponding to the 45 degree position of the rotor as already mentioned) the fluid pressure is lowered and the fluid moves from chamber 244 to chamber 70 of cylinder 90. At 45 degrees of rotation, the cam follower 72 begins to ride up the ramp 260 of indentation 75. This causes the piston 79 in the hydraulic cylinder 90 to retract, thus raising the fluid pressure and tending to activate the brake. The same affect occurs if the power rotor passes the 45 degree mark before it stops. To avoid damage to the hydraulic brake system, safety cylinders 262 and 264 are provided to absorb excess pressure. The plungers of these safety cylinders are biased by strong springs which are prestressed. If the fluid pressure in line 250 exceeds that of the prestressed springs, the pistons in the safety cylinders will retract thus relieving the fluid pressure.

As the output shaft 23 rotates during engine operation, the ball valve 234 also rotates at the same angular speed and, when passage 236 in the ball valve is aligned with the ports 238, the pressure from the fluid chamber 112 in the hydraulic brake 70 is released and permitted to flow through a suitably provided conduit or line 270 into the chamber 244 of cylinder 90. The roller or cam follower 72 is then free to climb the ramp 260 and the inner piston or power rotor is again free to move forward.

A complementary operation is performed with respect to the hydraulic brake 71.

While only one power rotor comprising shaft 40 and pistons 44, 45 is provided, both disc brakes are necessary to act as alternating reaction abutments for the power generated in the combustion chambers 43.

Turning now to FIG. 3, the internal structure of the power pistons will be described.

Each of the inner power pistons 44 and 45 comprise an outer sheath portion 301 connected to a central hub portion 303 which in turn is connected through splines 305 to the shaft 40. Hub 303 or shaft 40 are provided with one or more short splines 306 which define an oil passage past this section of shaft 40. Oil thus supplied through the oil conduit 32 travels through this short spline and may be conducted around the periphery of the pistons 44 and 45 between piston rings 310. Sheath portions 301 are preferably made of metal such as titanium having high strength and low heat conductivity and thermal expansion. Between the sheath portions 301, a sandwich portion 312 is provided in either piston 44 and 45 which is preferably made of material having high thermal conductivity such as aluminum or copper. The sandwich portion 312 is provided with projections 314 which extend into the channel formed by the short splines 306 and expose to the oil bath as it passes. Thus, advantageously in accordance with the invention, the highly thermally conductive sandwich portion 312 conducts heat away from the walls of the drum 5, defining the chambers 42 and into the channel defined by the short splines 306. The heat is picked up by the passing oil which passes the projections 314. The oil is also channeled around the outer periphery of the sandwich portion 312 by the rings 310. This arrangement provides for a piston having a lower coefficient of expansion with special means provided therein for conducting the heat away from the combustion chambers. The use of a sheath 301 which has low conductivity, permits the walls of the piston to remain at high temperatures to increase the efficiency of the combustion cycles within the chambers. While the temperature in the chamber is maintained at a high level, this level would be too high and cause the burning of oil so that the sandwich portion 312 of high conductivity is provided to maintain the oil at a relatively cooler level then the surfaces of the sheath portion 301. Note that all the surfaces to which the oil is exposed, that is the peripheral three surfaces of sandwich portion 312, come into contact with the highly thermally conductive portion 312.

Figure 7:
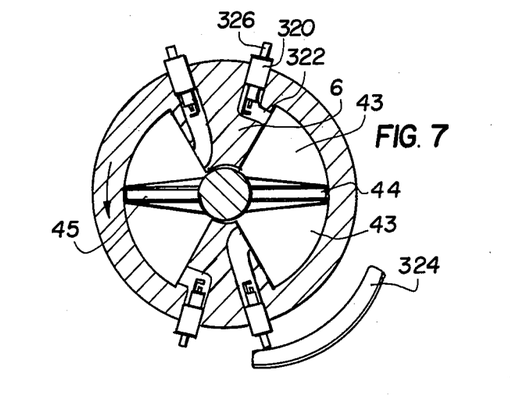
FIG. 7 is a partial front view in section of a spark plug arrangement for the invention.

Turning to FIG. 7, an arrangement is shown for providing the combustion impetus in the form of spark plugs to the chambers of the apparatus. Radial spark plugs 320 are shown connected into passages 322 and openings which communicate with the chambers 43. Spark plugs 320 are mounted in the conduits to prevent their being damaged by the approaching pistons 44 and 45. In a manner similar to radial air craft engines, the spark plugs 320 are energized by a commutator 324 which has an arcuate length sufficient to fire the fuel air mixture in a particular chamber 43 and engage with the bias contact end 346 of the spark plugs.

The spark ignition is preferably accomplished by electronic ignition means not shown in the figures. Such electronic ignition means are commercially available, comprising a light emitting diode and semiconductor current regulating means. It is customary that such devices comprise opto-isolator means so that triggering of the high current pulse is accomplished through light emitted by the light emmiting diode as it reaches a photo sensitive element through a rotating window. In the Tri-Rotor engine shown in FIGS. 1, and 2 a differential device such as 125 driven by the same timing belt 262 is used to adjust the angular phase of the window carrying plate, triggering the current pulses. The shaft carrying the window plate is analogous to shaft 258. A stepping motor analogous to 130 is driven by electronic pulses on terminal 165 provided by the microprocessor 160 through interface 164.

While specific embodiments of the invention have been shown and described in detail to illustrate the application of the principles of the invention, it will be understood that the invention may be embodied otherwise without departing from such principles.

What is claimed is:

1. A tri-rotor ballistic engine comprising:
  a frame;
  a drum, rotatably mounted on said frame, having an output shaft, a power cavity defined therein;
  a power shaft rotatably mounted in said drum;
  a reaction shaft rotatably mounted in said drum;
  a differential interconnection means interconnecting said power shaft, reaction shaft and drum so that when said drum is rotated at a constant angular velocity and one of said power and reaction shafts is held at zero angular velocity, the other of said power and reaction shafts rotates at twice said constant angular velocity;
  at least one inner power piston connected to said power shaft extending radially outwardly thereof and into said power cavity of said drum;
  said drum including at least one outer power piston extending into said power cavity to define at least two power chambers with said at least one inner power piston;
  first hydraulically operated holding means connected to said power shaft for holding said power shaft at zero angular velocity;
  second hydraulically operated holding means connected to said reaction shaft for holding said reaction shaft at zero angular velocity;
  control means connected to said first and second holding means for selective activation thereof; and
  power fluid means connected to said at least two power chambers for selectively pressurizing said power chambers and rotating said drum.

2. A ballistic engine according to claim 1 wherein said power shaft is axially aligned and lies on the major axis of said drum, said output shaft of said drum comprising an annular sleeve disposed around at least a portion of said power shaft.

3. A ballistic engine according to claim 2 wherein each of said holding means comprises a disc brake plate connected to said power shaft and reaction shaft respectively, each of said disc brake plates having a periphery extending radially outwardly of said drum and, hydraulic brake means engagable with each of said disc brake plates for grasping the respective outer peripheries thereof to selectively hold said power and reaction shafts at zero angular velocity.

4. A ballistic engine according to claim 3 further including valve means connected to each of said hydraulic brake means for selectively providing hydraulic fluid under pressure thereto, said valve means movable with each rotation of said drum to provide hydraulic fluid under pressure once to each of said hydraulic brake means.

5. A ballistic engine according to claim 4 further including differential valve activation means connected to said valve means for changing the position of said valve means at which hydraulic pressure is supplied to said hydraulic brake means, whereby the compression ratio of each of said power chambers can be changed.

6. A ballistic engine according to claim 5 wherein each of said disc brake plates has at least one indentation therein, said valve means comprising first and second cam followers movable along said disc brake plates respectively and into each of said indentations, a hydraulic cylinder associated with each of said cam followers, and a hydraulic piston slidable in each of said hydraulic cylinders and connected to each of said cam followers respectively.

7. A ballistic engine according to claim 6 wherein said valve means further comprises a ball valve rotatably mounted to said frame, said ball valve rotatable once for each revolution of said drum, and a plurality of hydraulic lines connected between each of said hydraulic cylinders and said ball valve for selectively applying hydraulic fluid under pressure to each of said hydraulic brake means.

8. A ballistic engine according to claim 5 wherein said differential means comprises a step motor driving a first side gear, a second gear driven by the output shaft, a pair of planetary gears interconnecting said first and second gears and driving said valve means, circuit means connected to said step motor for activating said step motor, and angular position sensing means connected to said circuit for sensing the relative angular position of said power shaft, said reaction shaft, and said drum.

9. A ballistic engine according to claim 2 further including a plurality of radially extending spaced fins connected from the exterior of said drum adjacent said power cavity, each of said fins having an opening at the base thereof nearest said power cavity whereby, with constant rotation of said drum, air is drawn through said openings and between said fins to cool said power cavity.

10. A ballistic engine according to claim 1 wherein said at least one inner power piston comprises an outer sheath of hard metal poor in thermal conductivity and an inner sandwich portion of metal having high thermal conductivity and oil passage means defined around the periphery of said sandwich portion.

11. A ballistic engine according to claim 10 wherein said outer sheath is made of titanium and said sandwich portion is made of aluminum.

12. A ballistic engine according to claim 10 wherein said inner power piston has an axial opening therethrough with a plurality of axially inwardly extending spline grooves extending therealong, said power shaft including a plurality of axially outwardly extending spline grooves interconnected with said spline grooves of said inner power piston, at least one of said spline grooves defining a channel extending axially along said power piston, lubrication means connected to said ballistic engine for the passage of oil through said passage, said sandwich portion including a plurality of projections extending into said passage whereby oil passing through said passage received heat conducted through said projections from said sandwich portion.

13. A ballistic engine according to claim 12 further including radially extending piston ring members extending between said sheath portion and said sandwich portion and axially extending piston ring members connecting said radially extending piston ring members for channeling oil around the outer periphery of said sandwich portion.

14. A ballistic engine according to claim 2 wherein said power fluid means comprises a slot plate connected to said frame having partially circumferencially extending slots at radially spaced locations therein, a port plate connected to said drum including a plurality of ports registerable with each of said slots respectively, at least one spring biasing said port plate into abutment with said slot plate, each of said ports having a cylinder extending therethrough having an opening communicating said slot with one of said power cavities, each of said cylinders having a reaction surface facing said cylinder and an abutment surface slidable along the surface of said slot plate, a spring between each of said cylinders and said drum for biasing each of said cylinders against said slot plate, with a space defined between said port plate and said drum.

15. A ballistic engine according to claim 1 wherein said drum further includes an energy storing cavity defined therein, at least one energy storing paddle extending from at least one of said power and reaction shafts, and into said energy storing cavity, said drum including at least one outer energy storing separator extending into said energy storing cavity to define at least two energy storing chambers with said at least one energy storing paddle.

16. A ballistic engine according to claim 15 wherein each of said outer energy storing separators includes a passage defined therethrough and communicating said at least two adjacent energy storing chambers, and passage constricting means extending across said passage for constricting the flow between said two adjacent energy storing chambers increasingly with increased angular speed of said one of said power and reaction shafts to which said energy storing paddles is connected.

17. A ballistic engine according to claim 16 wherein said constricting means comprises a slot extending radially across said outer energy storing separator and across said passage, a plate slidable in said slot biased radially inwardly thereof and having a shaped opening therethrough registerable with said passage to increasingly restrict the flow through said passage in a predetermined functional relationship when, by centrifugal force, said plate is moved radially outwardly in said slot.

18. A ballistic engine according to claim 17 further including adjustment means connected to said biasing means for changing the bias thereof.

19. A ballistic engine according to claim 8 wherein said position sensing means comprises a magnetic sensor spaced away from the periphery of said output shaft, said power shaft and said reaction shaft respectively, each of said power, reaction and output shafts having a plurality of ferromagnetic elements circumferencially spaced therearound the passage of which is senced by each of said magnetic sensors respectively.

20. A ballistic engine according to claim 3 wherein each of said disc brake plates includes a plurality of slots extending partially circumferencially therearound, said drum including connecting portions extending through said slots for connecting the portions of said drum on either side of said disc brake plates to each other and for permitting the relative rotation of at least 90° between each of said disc brake plates and said drum.

21. A ballistic engine according to claim 2 further including at least one spark plug extending radially into said outer power piston of said drum, said outer power piston having an opening communicating an operative end of said spark plug with said power chamber, said piston having a radially outward end movable into abutment with a comutator extending circumferencially around a portion of said drum to energize said spark plug at a selective angular position of said drum.

22. A ballistic engine according to claim 21 including means for generating current pulses thereby generating ignition sparks, and means for advancing or delaying the timing of such ignition sparks.

* * * * *